(12) United States Patent
Yasuda (10) Patent No.: US 8,928,977 B2
(45) Date of Patent: Jan. 6, 2015

(54) IMAGE STABILIZING APPARATUS AND OPTICAL APPARATUS HAVING THE SAME

(75) Inventor: Hiromu Yasuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 422 days.

(21) Appl. No.: 13/110,271

(22) Filed: May 18, 2011

(65) Prior Publication Data

US 2011/0292509 A1 Dec. 1, 2011

(30) Foreign Application Priority Data

May 27, 2010 (JP) ................... 2010-121366

(51) Int. Cl.
*G02B 27/64* (2006.01)
*G03B 5/00* (2006.01)

(52) U.S. Cl.
CPC ................ *G03B 5/00* (2013.01); *G02B 27/646* (2013.01); *G03B 2205/0015* (2013.01)
USPC ............................................ 359/557; 396/55

(58) Field of Classification Search
CPC .. G02B 27/646; G02B 27/64; H04N 5/23287; H04N 5/2254; H04N 5/23248; H04N 5/2328; G03B 2205/0015
USPC ....................... 359/554–557; 250/200–201.8; 396/52–55
See application file for complete search history.

(56) References Cited

U.S. PATENT DOCUMENTS

| 5,172,276 A * | 12/1992 | Ueyama et al. ............... 359/813 |
| 6,330,398 B1 * | 12/2001 | Tanaka et al. .................. 396/53 |
| 2008/0181594 A1 * | 7/2008 | Noguchi ......................... 396/55 |
| 2009/0003814 A1 * | 1/2009 | Okamura ........................ 396/55 |

FOREIGN PATENT DOCUMENTS

| CN | 1892296 A | 1/2007 |
| CN | 101231444 A | 7/2008 |
| JP | 11-007051 A | 1/1999 |
| JP | 2004-101721 A | 4/2004 |
| JP | 2007-108557 A | 4/2007 |
| JP | 2008-220031 A | 9/2008 |
| JP | 2010-008696 A | 1/2010 |

OTHER PUBLICATIONS

Notification of the First Office Action for CN 201110134971.1, dated Jul. 17, 2013. English translation provided.
Japanese Office Action for corresponding JP 2010-121366, mail date Feb. 4, 2014.

* cited by examiner

*Primary Examiner* — Derek S Chapel
(74) *Attorney, Agent, or Firm* — Rossi, Kimms & McDowell LLP (57) ABSTRACT

An image stabilizing apparatus for correcting an image shake by moving an optical element arranged in a lens barrel in a plane orthogonal to an optical axis includes a first rolling holder configured to support a first rolling member so as to be capable of rolling in a first direction orthogonal to the optical axis, the first rolling member moving the optical element in the first direction, and a fixed member attached to a surface of the first rolling holder and providing support for the lens barrel, the first rolling member being provided on the surface.

13 Claims, 6 Drawing Sheets

PRIOR ART

PRIOR ART

FIG. 8

IMAGE STABILIZING APPARATUS AND OPTICAL APPARATUS HAVING THE SAME

BACKGROUND OF THE INVENTION

1. Field of the Invention

The present invention relates to an image stabilizing apparatus installed in the optical apparatus.

2. Description of the Related Art

The image stabilizing apparatus requires to support a movable member holding a lens so as to be movable in a direction where a camera is horizontally shaken (hereafter, a yaw direction) and a direction where the camera is vertically shaken (hereafter, a pitch direction) without a move in an optical axis direction and a friction.

In order to realize the above image stabilizing apparatus, Japanese Patent Laid-Open No. H11-007051 provides a guiding member including a ball holding member extending in the yaw and pitch directions between a fixed member and a movable member holding a lens.

The image stabilizing apparatus disclosed in Japanese Patent Laid-Open NO. H11-007051, however, has a problem in which, since some components are configured to overlap in an optical axis direction, a position of the lens easily shifts by a variation of a processing accuracy of the components and an optical performance deteriorates. Moreover, it is difficult to thin the entire apparatus. Furthermore, the balls are departed in assembling or by a shock.

SUMMARY OF THE INVENTION

The present invention provides an image stabilizing apparatus and an optical apparatus having reduced thickness in an optical axis direction.

An image stabilizing apparatus as one aspect of the present invention is an image stabilizing apparatus for correcting an image shake by moving an optical element arranged in a lens barrel in a plane orthogonal to an optical axis, the image stabilizing apparatus including a first rolling holder configured to support a first rolling member so as to be capable of rolling in a first direction orthogonal to the optical axis, the first rolling member moving the optical element in the first direction, and a fixed member attached to a surface of the first rolling holder and providing support for the lens barrel, the first rolling member being provided on the surface.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 7:
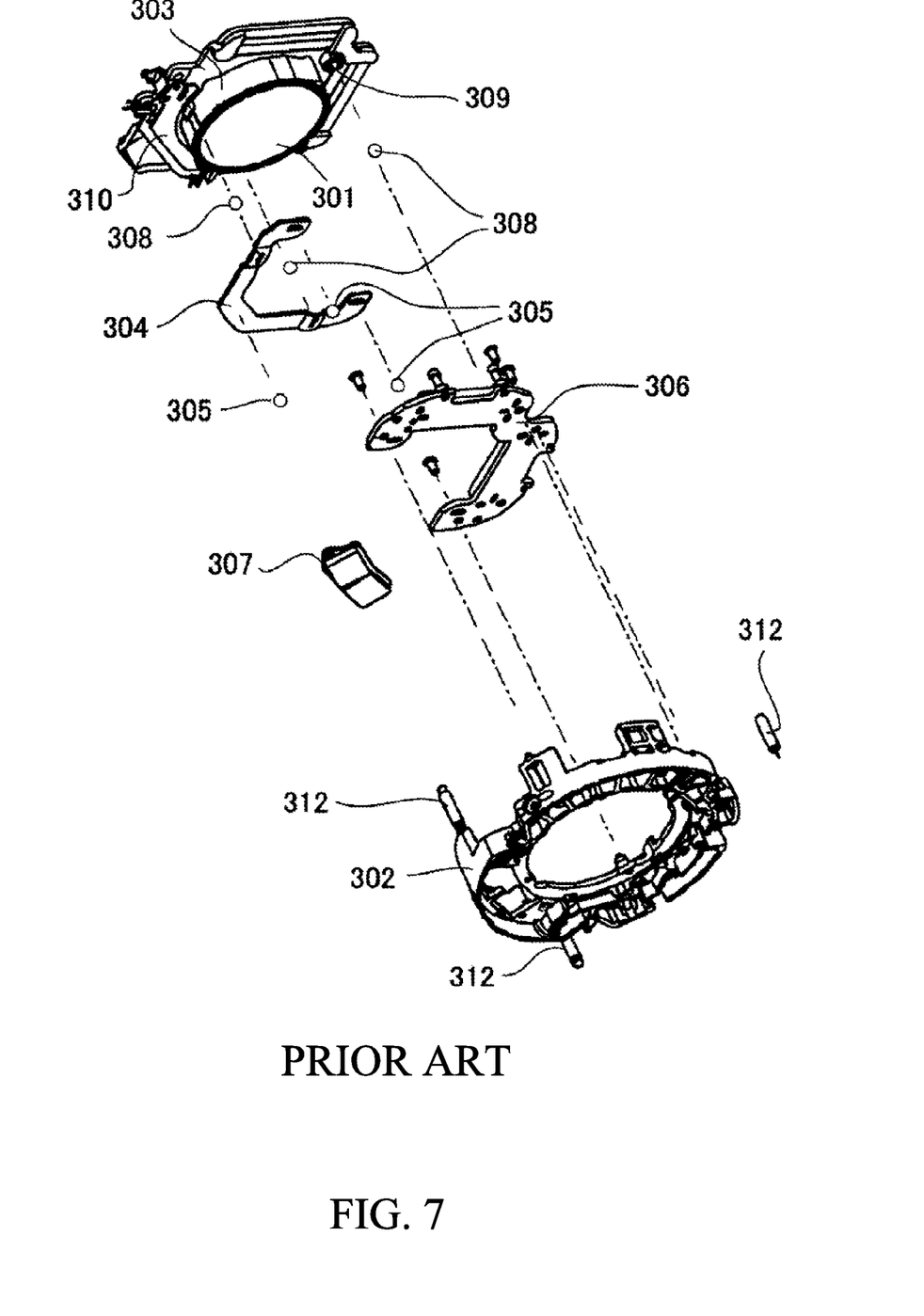
FIG. 7 is an exploded perspective view that illustrates a component formation of a conventional image stabilizing apparatus.
Figure 8:
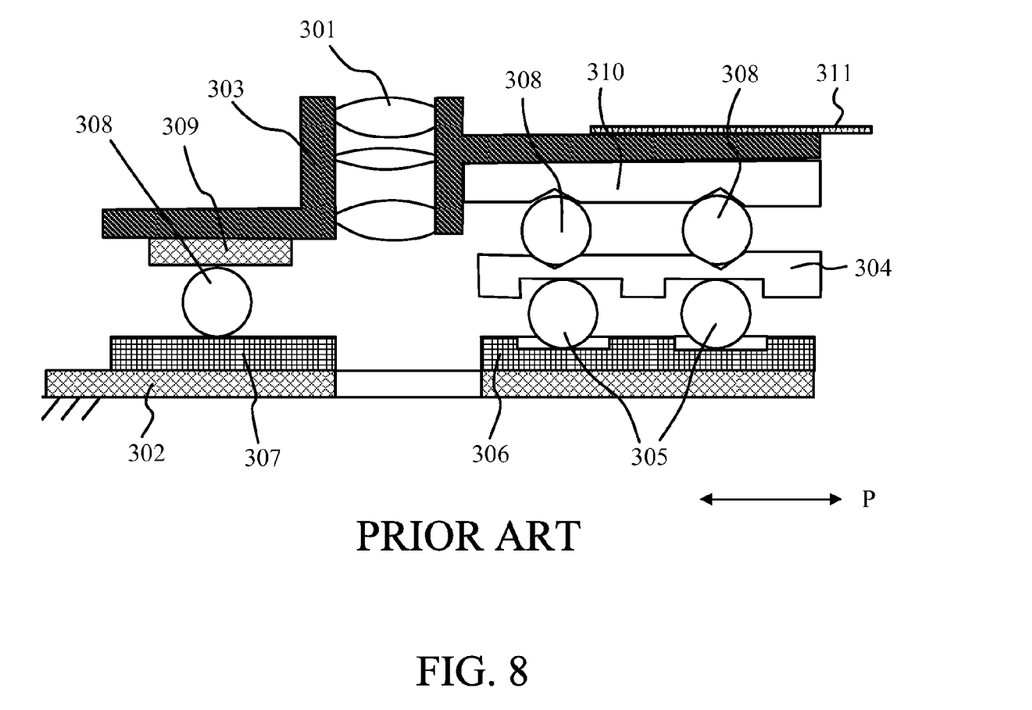
FIG. 8 is a pattern diagram that illustrates a composition of a conventional image stabilizing apparatus.

First of all, a conventional image stabilizing apparatus will be described referring to FIG. 7 and FIG. 8. FIG. 7 is an exploded perspective view that illustrates a structure of a conventional image stabilizing apparatus, and FIG. 8 is a pattern diagram that illustrates a sectional surface, parallel to an optical axis, of an image stabilizing apparatus assembled from FIG. 7.

This conventional image stabilizing includes a correction lens 301, a fixed base plate 302, a movable lens barrel 303, a guiding member 304, a first rolling ball 305, first rolling holders 306 and 307, a second rolling ball 308, and second rolling holders 309 and 310. It further includes a feed cable 311 and a bias member 312.

The rolling balls 305 and 308 may be made of a hard material in order to reduce a rolling resistance.

Moreover, the fixed base plate 302 and the movable lens barrel 303 for positioning various components have complex shapes, and therefore are suitable for being manufactured by a resin molding tool.

On the other hand, when a load of the movable member increases such as by an increase of a weight of a lens, a great pressure occurs at positions contacting the rolling balls. The structure in which a mold resin and the rolling balls contact may be deformed or abraded by that pressure. Accordingly, it is necessary that the rolling holders 306, 307, 309 and 310 which hold the rolling balls are assembled on the movable lens barrel 303 and the fixed base plate 302 of mold components. Moreover, the rolling holders are suitable for using a hard material such as stainless-steel and being manufactured by a press molding.

On the other hand, this image stabilizing apparatus is attached to a lens barrel (not shown) that supports an image-pickup member such as other lens unit, films, and CCDs via an attachment part provided on the fixed base plate 302. Therefore, a position for other lens units or an image-pickup member can be defined with high accuracy by accurately defining a position in an optical axis direction and an inclination between the fixed base plate 302 and the lens barrel (not shown).

However, this conventional image stabilizing apparatus provides many components such as the first rolling holder, the first rolling ball, the guiding member, the second rolling ball, and the second rolling holder between the fixed base plate 302 and the correction lens 301.

Unfortunately, the first rolling holder, the guiding member and the second rolling holder, which are processed by the press molding, widely vary the thickness, and a position relationship between the correction lens 301 and the fixed base plate 302 is changed by change of a lot. In particular, when the rolling holder is separated to two components as a conventional image stabilizing apparatus illustrated in FIGS. 7 and 8, the correction lens 301 tips from a reference position by the variation in each board thickness and a lens performance deteriorates.

Furthermore, as illustrated in FIG. 8, since some components tandemly overlay in the optical axis direction, it is different to thin the image stabilizing apparatus in the optical axis direction.

In the above-mentioned configuration, the feed cable 311 for feeding to a coil fixed on the movable lens barrel 303 is fixed on an upper part of the movable lens barrel 303 by using a double-faced tape or the likes. Accordingly, when the double-faced tape comes off, the feed cable 311 interferes with other components and the move of the movable lens barrel 303 may be encumbered.

Furthermore, since there is a cavity around the balls, the balls roll in assembling and the workability deteriorates. Moreover, the balls may fall out a predetermined position when the apparatus is subjected to a vibration or a shock.

Next, the image stabilizing apparatus in the first embodiment of the present invention will be described referring to FIGS. 1 to 5.

First, a general stabilizing system will be described referring to FIG. 5.

Figure 5:
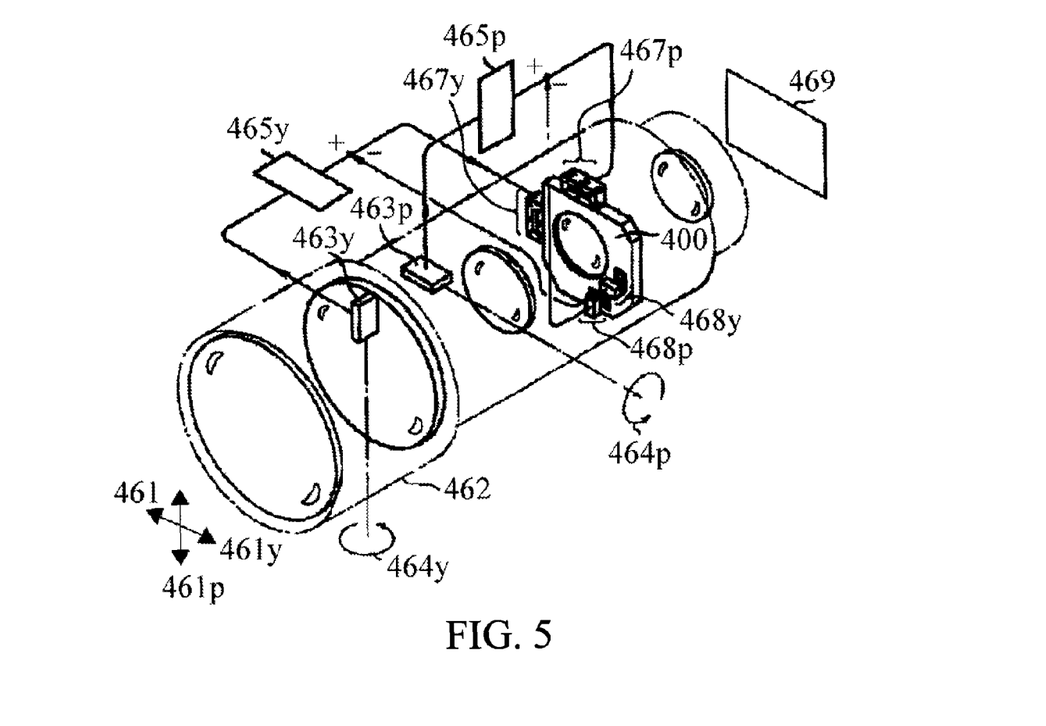
FIG. 5 is a block diagram to describe a general stabilizing system.

FIG. 5 is directed to a system that suppresses an image shake caused by a camera shake in the pitch direction 461p and a camera shake in the yaw direction 461y of directions indicated by arrows 461.

In the drawing, reference numeral 462 denotes a lens barrel including an image-pickup optical system, reference numerals 463p and 463y respectively denote an angular displacement detector for detecting an angular displacement of the camera shake in the pitch direction and an angular displacement detector for detecting an angular displacement of the camera shake in the yaw direction, and reference numerals 464p and 464y denote detected directions of the angular displacements. Reference numerals 465p and 465y denote calculation circuits, and calculate signals from the angular displace detectors 463p and 463y to transform it into a drive target signal of the image stabilizing apparatus 400. The image stabilizing apparatus 400 is driven using this signal and is secured of stabilization in an image surface 469. Reference numerals 467p and 467y denote drive units of the image stabilizing apparatus 400, and reference numerals 468p and 468y denote shift position detecting sensors of the correction lens.

Next, the configuration of the image stabilizing apparatus 100 in the present embodiment will be described referring to FIGS. 1 to 4.

Figure 1:
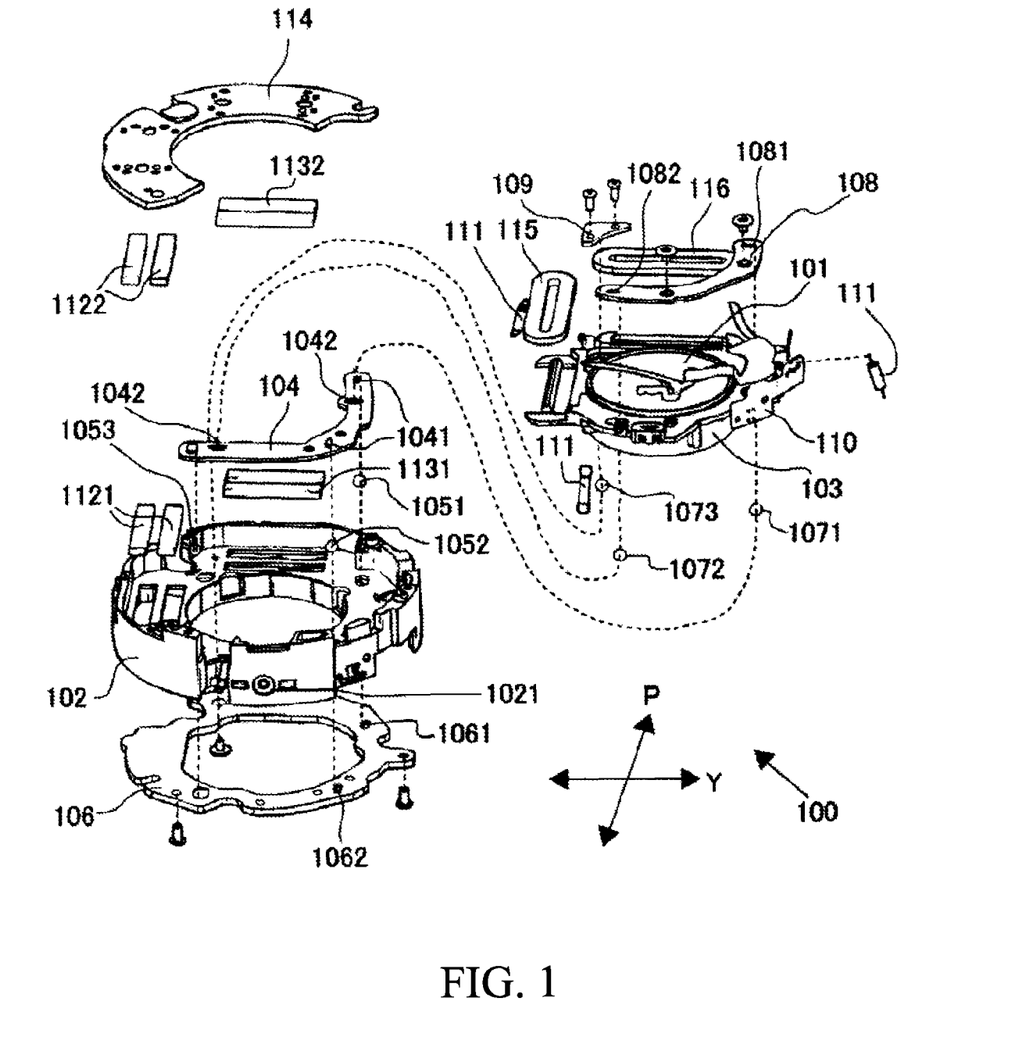
FIG. 1 is an exploded perspective view that illustrates a component formation of an image stabilizing apparatus in the present invention.

FIG. 1 is an exploded perspective view that illustrates the component formation in this embodiment.

The image stabilizing apparatus in this embodiment includes a correction lens 101, a fixed base plate 102, a movable lens barrel 103, and a guiding member 104. Moreover, it includes first rolling balls 1051, 1052 and 1053, a first rolling holder 106, second rolling balls 1071, 1072 and 1073, and a second rolling holder 108. Furthermore, it includes a sub-plate 109, a feed cable 110, bias springs 111, pitch magnets 1121 and 1122, yaw magnets 1131 and 1132, an upper yoke 114, a pitch coil 115, and a yaw coil 116.

The correction lens 101 is a lens configuring a part of an image-pickup optical system (not shown), and decenters an optical axis as a deflection optical element. It moves in a plane orthogonal to the optical axis and can move an image formed by the image-pickup optical system. Therefore, it is possible to be secured of the stabilization in an image surface by the above-mentioned method when detecting a hand shake.

In addition, this embodiment uses a lens as a deflection optical element, but may use an image-pickup element such as CCDS and C-MOS sensors.

Figure 2:
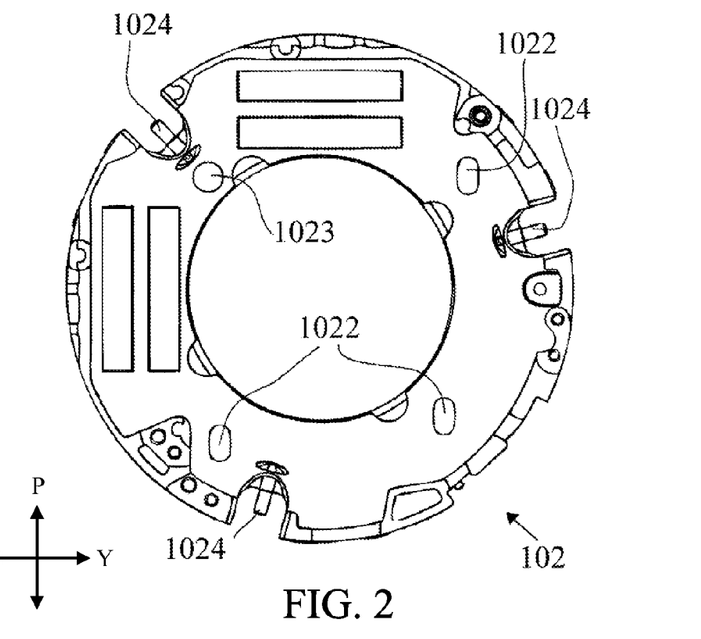
FIG. 2 is a front view of a fixed base plate.

The fixed base plate (fixed member) 102, as illustrated in FIG. 2, is formed into an approximate disk-like shape, has an opening in a central part, and can pass through a light flux.

Moreover, the fixed base plate 102 has installation holes 1021 capable of fixing installation rings in three places on an outer side piece part as illustrated in FIG. 1. At these holes, the fixed base plate 102 is fixed in the lens barrel which fixes other lens units, for example, an imaging optical system. In other words, the installation hole 1021 defines a base position of the image stabilizing apparatus.

Furthermore, the fixed base plate 102 has first rolling ball arrangement grooves (first opening) 1022 as illustrated in FIG. 2. The first rolling ball arrangement grooves 1022 are as many as the first rolling balls (three in this embodiment), and the first rolling balls 1051, 1052 and 1053 can be assembled therein. The size of openings of the first rolling ball arrangement grooves 1022 is larger than movable range of the first rolling balls 1051, 1052 and 1053. In other words, when the width of the first rolling balls is defined as d, the width of the openings of the first rolling ball arrangement grooves 1022 is wider than d and is narrower than 2d. When the width of the openings of the first rolling ball arrangement grooves 1022 is narrower than d, the first rolling ball contacts the first rolling ball arrangement groove 1022 and cannot roll. Moreover, when the width of the openings of the first rolling ball arrangement grooves 1022 is wider than 2d, the miniaturization and after-mentioned assembling of the image stabilizing apparatus are difficult.

Furthermore, the fixed base plate 102 has a first rolling ball arrangement hole 1023 (first aperture). One first rolling ball arrangement hole 1023 is provided and can house a second rolling ball 1073 therein, and the size of an opening of the hole is larger than a movable range of the second rolling ball 1073. Since the second rolling ball 1073 rolls in plane of the movable lens barrel 103 that is orthogonal to optical axis, the first rolling ball arrangement hole 1023 has an opening larger than the openings of the first rolling ball arrangement grooves 1022. As illustrated in FIG. 2, the opening of the first rolling ball arrangement hole 1023 has a circular shape and the openings of the first rolling ball arrangement grooves 1022 have a long hole shape extending in the pitch direction. However, the openings in the present invention are not limited to those shapes and, for example, may have rectangular shapes.

Figure 4:
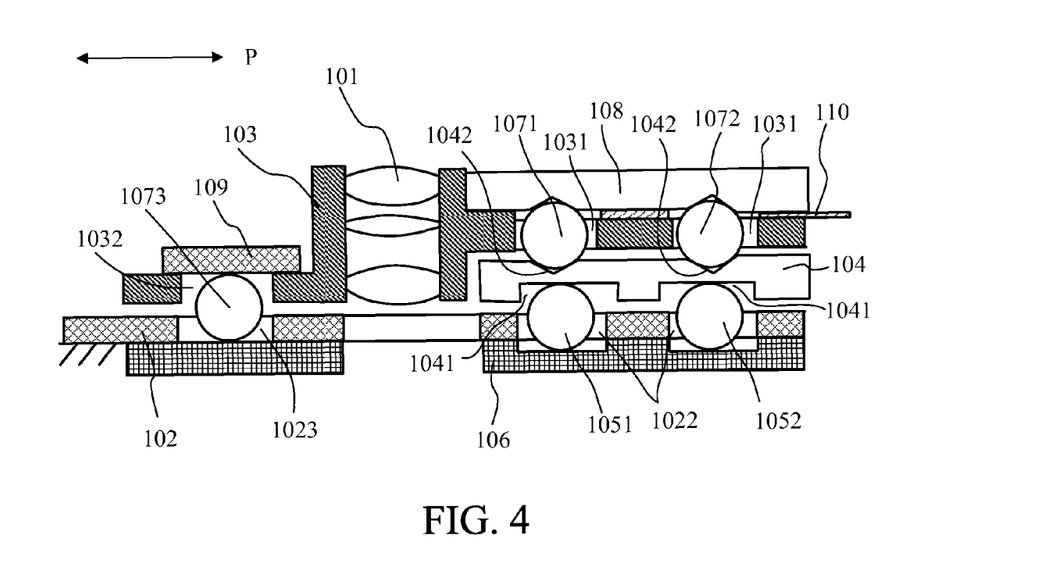
FIG. 4 is a pattern diagram that illustrates a composition of the image stabilizing apparatus of the present invention.

The first openings 1022 and 1023 are configured as a through-hole orthogonal to upper and under surfaces of the fixed base plate 102 as illustrated in FIG. 4.

Moreover, the fixed base plate 102 includes three spring hanging parts 1024 that assemble bias springs (elastic member) 111.

Figure 3:
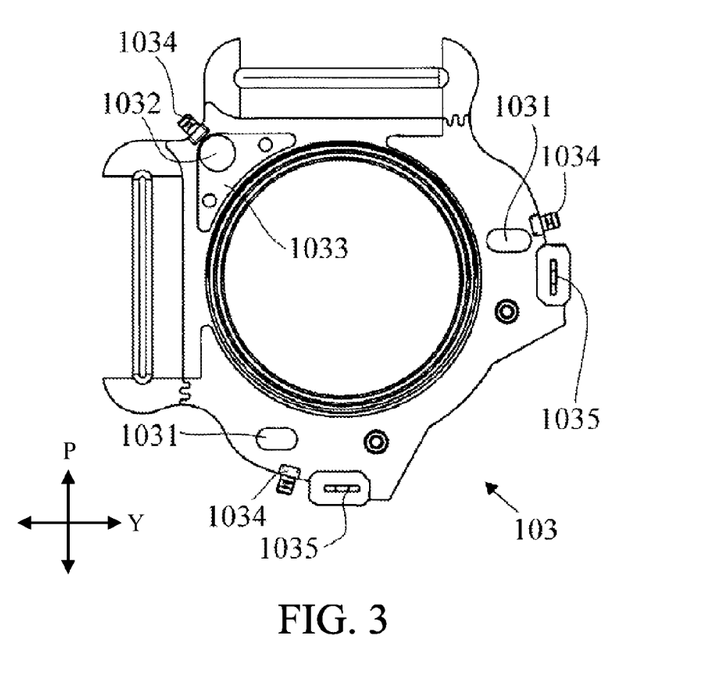
FIG. 3 is a front view of a movable lens barrel.

The movable lens barrel (movable member) 103 can hold the correction lens 101 in a central opening as illustrated in FIG. 3.

The movable lens barrel 103 is supported so as to be movable with respect to the fixed base plate 102 in a plane orthogonal to the optical axis by after-mentioned method.

Moreover, the movable lens barrel 103 has two second rolling ball arrangement grooves (second opening) 1031 and one second rolling ball arrangement hole (second opening) 1032. The second rolling ball arrangement grooves 1031 can house the second rolling balls 1071 and 1072 therein and the size of openings of the grooves is larger than movable range of the second rolling balls. In other words, the width of openings of the second rolling balls arrangement grooves 1031 is wider than the width d of the second rolling balls 1071 and 1072, and is narrower than the width 2d. When the width of the openings of the second rolling ball arrangement grooves 1031 is narrower than d, the second rolling balls 1071 and 1072 contact the second rolling ball arrangement grooves 1031 and cannot roll. Furthermore, when the width of the openings of the second rolling ball arrangement grooves 1031 is wider than 2d, the miniaturization and after-mentioned assembling of the image stabilizing apparatus are difficult. The second rolling ball arrangement hole 1032 can house the second rolling ball 1073 therein, and the size of an opening of the hole is larger than movable range of the second rolling ball 1073. Since the second rolling ball 1073 rolls in a plane of the movable lens barrel 103 that is orthogonal to the optical axis, the second rolling ball arrangement hole 1032 has an opening larger than the opening of the second rolling ball arrangement grooves 1031. In addition, as illustrated in FIG. 3, the second rolling ball arrangement hole 1032 has a circular shape, and the second rolling ball arrangement grooves 1031 have a long hole shape extending in the yaw direction. However, the openings in the present invention are not limited to those shapes and, for example, may have rectangular shapes.

The second openings 1031 and 1032 are configured as a through-hole orthogonal to upper and under surfaces of the movable lens barrel 103 as illustrated in FIG. 4.

The movable lens barrel 103 includes a groove 1033 for assembling the sub-plate 109.

The movable lens barrel 103 includes three spring hanging parts 1034 for fixing bias springs 111.

Moreover, the movable lens barrel 103 includes a LED holder 1035 for assembling a LED to be detected by a position sensor.

The movable lens barrel 103 can fix the pitch coil 115 and the yaw coil 116.

The guiding member 104 is made of a material having a high rub resistance such as stainless-steel. Therefore, even when the rolling ball is made of a hard material, a contacting part is not whittled and the guiding member 104 can stand long use.

The guiding member 104 is supported so as to be movable in the yaw direction (first direction) with respect to the fixed base plate 102, and supports the movable lens barrel 103 so as to be movable in the pitch direction (second direction).

The pitch and yaw directions are orthogonal to each other. Moreover, the pitch and yaw directions are orthogonal to the optical axis. Therefore, the movable lens barrel 103 is supported without rolling so as to be movable with respect to the fixed base plate 102 in a plane orthogonal to the optical axis.

The guiding member 104 includes two first rolling guiding parts 1041 as illustrated in FIGS. 1 and 4. The first rolling guiding parts 1041 form a V-shaped sectional surface in the yaw direction. Therefore, the first rolling balls 1051 and 1052 can be supported so as to be capable of rolling in the pitch direction whiling contacting at two points without a backlash.

Moreover, the guiding member 104 has two second rolling guiding parts 1042 in a plane opposite to a plane where the first rolling guiding parts 1041 are provided. The second rolling guiding parts 1042 form a V-shaped sectional surface in the pitch direction. Therefore, the second rolling balls 1071 and 1072 can be supported so as to be capable of rolling in the yaw direction whiling contacting at two points without a backlash.

In this embodiment, the first rolling guiding parts 1041 in two positions and the second rolling guiding parts 1042 in two positions are respectively provided on the same component, and therefore can support each direction with high accuracy.

The first rolling balls (first rolling member) 1051-1053 are made of a material having a high hardness to make a rolling resistance smaller and to form with high processing accuracy.

The first rolling balls 1051-1053 support the guiding member 104 so as to be movable with respect to the fixed base plate 102 in the yaw direction.

The first rolling holder 106 is made of a material having a high rub resistance such as stainless-steel. Therefore, even when the rolling ball is made of a hard material, a contacting part is not whittled and the first rolling holder 106 can stand long use. Moreover, this embodiment can use a yoke of an electronic actuator together by using a ferromagnet material such as martensitic stainless-steel.

The first rolling holder 106 contacts the fixed base plate 102 and is fixed by screws. A surface contacting the fixed base plate 102 includes first guiding parts 1061 and 1062. The first guiding parts 1061 and 1062 forms V-shaped sectional surfaces in the yaw direction. Therefore, the first rolling balls 1051 and 1052 can be supported so as to be capable of rolling in the pitch direction whiling contacting at two points without a backlash.

The second rolling balls (second rolling member) 1071-1073 is made of a material having a high hardness to make a rolling resistant smaller and to form with high processing accuracy. The second rolling balls support the movable lens barrel 103 so as to be movable with respect to the guiding member 104 in the yaw direction.

The second rolling holder 108 may be formed by a metal having the high rub resistance such as stainless-steel.

The second rolling holder 108 contacts the movable lens barrel 103 and is fixed. A surface contacting the movable lens barrel 103 includes second guiding parts 1081 and 1082. The second guiding parts 1081 and 1082 form V-shaped sectional surfaces in the pitch direction. Therefore, the second rolling balls 1071 and 1072 can be supported so as to be capable of rolling in the yaw direction whiling contacting at two points.

The sub-plate 109 may be formed by a metal having the high rub resistance such as stainless-steel. Moreover, it may be produced by a press working that excels in mass productivity.

The sub-plate 109 is fixed to the movable lens barrel 103, contacts the second rolling ball 1073, and supports the movable lens barrel 103 so as to be movable with respect to the fixed base plate 102.

The feed cable 110 is made of a material having flexibility, and electrically contacts electric components such as a yaw coil and a pitch coil that assembled to the movable lens barrel 103 and a LED to be detected, and power source (not shown). That is, the feed cable 110 supplies the power from the power source to the electric components.

The bias springs (bias member) 111 cause the biasing force (pressing force) between the movable lens barrel 103 and the fixed base plate 102.

In addition, the bias members 111 may use electrostatic power and magnetic power other than an elastic member such as springs. The first and second rolling balls will constantly contact by pressing the movable lens barrel 103 to the fixed base plate 102 in the optical axis.

A pitch direction actuator includes the pitch magnets 1121 and 1122, the pitch coil 115, the first rolling holder 106, and the upper yoke 114.

Moreover, a yaw direction actuator includes the yaw magnets 1131 and 1132, the yaw coil 116, the first rolling holder 106, and the upper yoke 114.

The pitch magnets 1121 and 1122 form a magnet field that will cause thrust force in the pitch direction when the electric power is conducted to the pitch coil 115.

The yaw magnets 1131 and 1132 form a magnet field that will cause thrust force in the yaw direction when the electric power is conducted to the yaw coil 116.

The upper yoke 114 and the first rolling holder 106 function as yokes of the pitch direction actuator and the yaw direction actuator, reduce the magnet resistance of each magnet, and improve the efficiency of the actuators.

Each actuator is a well known electromagnetic actuator. In this embodiment, the first rolling holder 106 doubles as each yoke of actuators, thereby reducing the number of components.

The present invention does not limit the type of actuator and may use a well known actuator that drives the movable lens barrel 103 with respect to the fixed base plate 102 in two directions orthogonal to the optical axis. In concrete, an electrostatic actuator, a piezo actuator, and a super-magnetostrictive actuator or the likes may be used. Moreover, as this embodiment, two actuators of one degree of freedom type or one actuator of two degrees of freedom type may be used.

A fixture part unit is configured by fixing the first rolling holder 106, the pitch magnet 1121 and the yaw magnet 1131 in the fixed base plate 102.

Moreover, a lens barrel unit is configured by fixing the correction lens 101, the second rolling holder 108, the sub-plate 109, the feed cable 110, the pitch coil 115, and yaw coil 116 in the movable lens barrel 103. At this time, the feed cable 110 is arranged so as to be interleaved between the movable lens barrel 103 and the second rolling holder 108, thereby preventing a detachment of the feed cable 110. The feed cable 110 may be provided on not the movable lens barrel 103 but the fixed base plate 102. In this case, the feed cable 110 is arranged so as to be interleaved between the fixed base plate 102 and the first rolling holder 106, thereby preventing a detachment of the feed cable 110.

A fixture part unit and the guiding member 104 interleave the first rolling balls 1051, 1052 and 1053. The first rolling balls 1051 and 1052 are controlled by the first rolling guiding part 1041 provided on the guiding member 104 and the first guiding part 1061 and 1062 provided on the first rolling holder 106. The guiding member 104 is supported so as to movable with respect to the fixed base plate 102 in only the pitch direction without a backlash. The guiding member 104 is supported by three balls of the first rolling balls 1051, 1052 and 1053, thereby being positioned stably in the optical axis.

The guiding member 104 and a lens barrel unit interleaves the second rolling balls 1071, 1072 and 1073. The second rolling balls 1071 and 1072 are controlled by the second rolling guiding part 1042 provided on the guiding member 104 and the second guiding parts 1081 and 1082 provided on the second rolling holder 108. The lens barrel unit is supported so as to be movable with respect to the guiding member 104 in only the yaw direction without a backlash. The lens barrel unit is supported by three balls of the second rolling balls 1071, 1072 and 1073, thereby being positioned stably in the optical axis.

In this case, the second rolling ball 1073 may be supported by contacting the guiding member 104, and may be supported by contacting the first rolling ball holder 106 as this embodiment.

Therefore, the movable lens barrel 103 is supported so as to be movable with respect to the fixed base plate 102 in a plane orthogonal to the optical axis without a backlash and a rotation.

The correction lens 101 can be moved at a predetermined position by generating predetermined thrust force in the pitch and yaw actuators.

The effect of the present invention will be described while comparing FIG. 4 that is a schematic diagram of the present invention and FIG. 8 that is a schematic diagram of a conventional image stabilizing apparatus.

In addition, FIGS. 4 and 8 illustrate schematic diagrams of a sectional surface parallel to the optical axis in the image stabilizing apparatus.

As illustrated in FIG. 8, the movable lens barrel 303 is assembled on a plane opposite to a plane contacting the second rolling balls 308 in the second rolling holders 309 and 310. Moreover, the fixed base plate 302 is assembled on a plane opposite to a plane contacting the first rolling balls 305 and the second rolling ball 308 in the first rolling holders 306 and 307. In other words, the fixed base plate 302 and the movable lens barrel 303 are positioned by interleaving the first rolling ball 305, the guiding member 304 and the second rolling ball 308 between the first rolling holders 306 and 307 and the second rolling holders 309 and 310.

Accordingly, when board thicknesses in the first rolling holders 306 and 307 or in the second rolling holders 309 and 310 are different, a position of the lens is changed, for example the lens is inclined. This is because, although it is preferred that the first and second rolling holders are manufactured by a press working that excels in mass productivity, the press working generally may cause the difference by a lot.

On the other hand, in FIG. 4, the movable lens barrel 103 is assembled on a plane contacting the second rolling balls 1072 and 1073 of the second rolling holders 108 and 109. In cases like this, even when board thicknesses of the second rolling holders 108 and 109 have differences, the position relationship between the fixed base plate 102, which defines a reference position for comparison with other optical members, and the correction lens 101 is not affected. Since the movable lens barrel 103 is not arranged via the second rolling holders 108 and 109 (the board thicknesses thereof), the error factor can be reduced and the optical performance of the image stabilizing apparatus can be stabilized, as compared to the conventional image stabilizing apparatus.

In particular, as this embodiment, when the second rolling holder is separated in a plurality of components such as the sub-plate 109 and the second rolling holder 108, a lens is not inclined if the board thicknesses have differences and the optical performance of the image stabilizing apparatus can be stabilized.

Similarly, in FIG. 4, the fixed base plate 102 is assembled on a plane contacting the first rolling balls 1051 and 1052 and the second rolling ball 1073 in the first rolling holder 106. In cases like this, even when the board thickness of the first rolling holder 106 has differences, the position relationship between the fixed base plate 102, which defines a reference position for comparison with other optical members, and the correction lens 101 is not affected. Since the fixed base plate 102 is not arranged via the first rolling holder 106 (the board thicknesses thereof), the error factor can be reduced and the optical performance of the image stabilizing apparatus can be stabilized, as compared to the conventional image stabilizing apparatus.

Moreover, in the above arrangement, the thickness of the optical axis direction of the image stabilizing apparatus can be thinned. This will be described in detail as follows.

In conventional, as illustrated in. 8, the distance (thickness) from the bottom of the apparatus to the guiding member 304 is required by (thickness of the fixed base plate+thickness the first rolling holder+diameter of the first rolling ball).

However, in the present invention, since the fixed base plate 102 and the first rolling balls 1051 and 1052 can be parallel arranged in the optical axis direction as illustrated in FIG. 4, the distance from the bottom of the apparatus to the guiding member 104 is just required by (thickness of the first rolling holder+diameter of the first rolling ball). In other words, the first rolling balls 1051 and 1052 and the first opening 1022 of the fixed base plate 102 are arranged in a plane orthogonal to the optical axis between the first rolling holder 106 and the guiding member 104. Moreover, the second rolling ball 1073 and the first opening 1023 are arranged in a plane orthogonal to the optical axis between the second rolling holder 109 and the first rolling holder 106. Therefore, the image stabilizing apparatus can be thinned by the thickness of the fixed base plate. In this case, the diameter of the first rolling balls needs to be made larger than at least the thickness of the fixed base plate in order to prevent the interference to the fixed base plate.

Moreover, in conventional, the distance from the top of the apparatus to the guiding member 104 is just required by (thickness of the movable lens barrel+thickness of the second rolling holder+diameter of the second rolling ball) as illustrated in FIG. 8.

However, in the present invention, since the movable lens barrel 103 and the second rolling balls 1071-1073 can be parallel arranged in the optical axis direction as illustrated in FIG. 4, the distance from the top of the apparatus to the guiding member 104 is just required by (thickness of the second rolling holder+diameter of the second rolling ball). In other words, the second rolling member 1071 and 1072 and the second opening 1031 of the movable lens barrel 103 are arranged in a plane orthogonal to the optical axis between the second rolling holder 108 and the guiding member 104. Moreover, the second rolling ball 1073 and the second opening 1032 are arranged in a plane orthogonal to the optical axis between the second rolling holder 109 and the first rolling holder 106. Therefore, the image stabilizing apparatus can be thinned by the thickness of the movable lens barrel. In this case, the diameter of the second rolling ball needs to be made larger than at least the thickness of the lens barrel in order to prevent the interference to the movable lens barrel.

Furthermore, the present invention provides the first opening on the fixed base plate 102 and provides the second opening on the movable lens barrel 103 as illustrated on FIGS. 2 and 3, and therefore can configure an image stabilizing apparatus that excels in assembling and where the ball is resistant to depart in vibration and shock.

In a conventional image stabilizing apparatus, no component is arranged around the rolling balls 305 and 308 as illustrated in FIG. 8. Therefore, the entire apparatus is subjected to a vibration or a shock and the movable lens barrel moves by the distance larger than the depth of the guiding part in the optical axis, and thereby the balls fall out.

On the other hand, in the present invention, a protection barrier (side walls of the first and second openings) is arranged around the rolling balls as illustrated in FIG. 4 and the rolling balls are difficult to depart from the guiding member in vibration or shock due to drop.

Moreover, since the balls are different to roll in assembling, the working property improves and the assembly cost can be decreased. Furthermore, in the conventional configuration, the balls gravitate to a strong magnetic field due to actuators when a magnetic material is used in the balls, and the assembly has been difficult. However, in this embodiment, since there is the protection barrier, which restricts the movement of the balls, the magnet material can be used in the balls.

Moreover, the present invention arranges the feed cable 110 in a narrow space between the movable lens barrel 103 and the second rolling ball holder 108, which is fixed by screws, as illustrated in FIG. 4. Therefore, the feed cable 110 can be stably fixed on the movable lens barrel 103, the feed cable 110 is in no danger of the detachment, and the feed cable 110 is scarcely rubbed with other components during moving the movable lens barrel 103. Furthermore, the image stabilizing apparatus can be thinned by the thickness of the feed cable as compared to the conventional configuration in FIG. 8.

Although this embodiment arranges the feed cable 110 as illustrated in FIG. 4, the present invention is not limited to this configuration. In other words, the feed cable 110 may be arranged in a narrow space between the fixed base plate 102 and the first rolling ball holder 106, which is fixed by a screw. In this case, the feed cable 110 can be stably fixed on the fixed base plate 102, the feed cable 110 is in no danger of the detachment, and the feed cable is scarcely rubbed with other components during moving the movable lens barrel. Furthermore, the image stabilizing apparatus can be thinned by the thickness of the feed cable as compared to the conventional configuration in FIG. 8.

As above, although this embodiment has described the image stabilizing apparatus, the image stabilizing apparatus can be installed in an optical apparatus including a video camera, an image-pickup apparatus such as a digital camera and a silver salt still camera, and an observation apparatus such as a binocular, a telescope and a fieldscope. Therefore, an optical apparatus including the image stabilizing apparatus in this embodiment also configures one aspect of the present invention.

Embodiment 2

Next, the lens shift applies the second embodiment of the present invention will be described using FIGS. 6A and 6B.

Those components, which are corresponding components in the first embodiment, are designated by the same reference numerals and the duplicate descriptions thereof will be omitted.

Figure 6A:
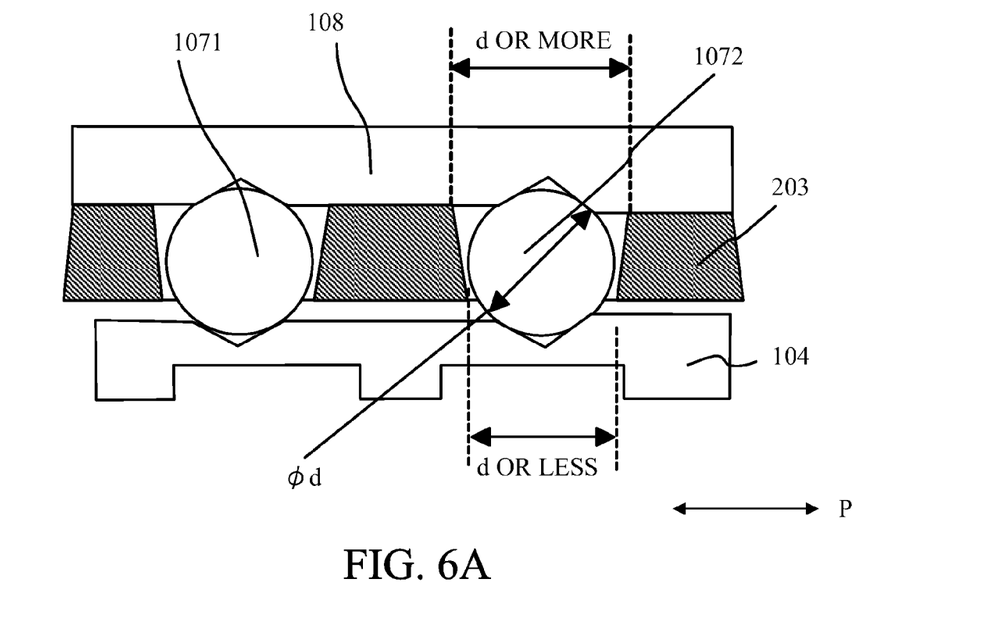
FIGS. 6A and 6B are sectional views through a center of a rolling ball in the second embodiment.

FIG. 6A illustrates a sectional surface in the pitch direction through a center of the second rolling balls 1071 and 1072 in this embodiment.

Figure 6B:
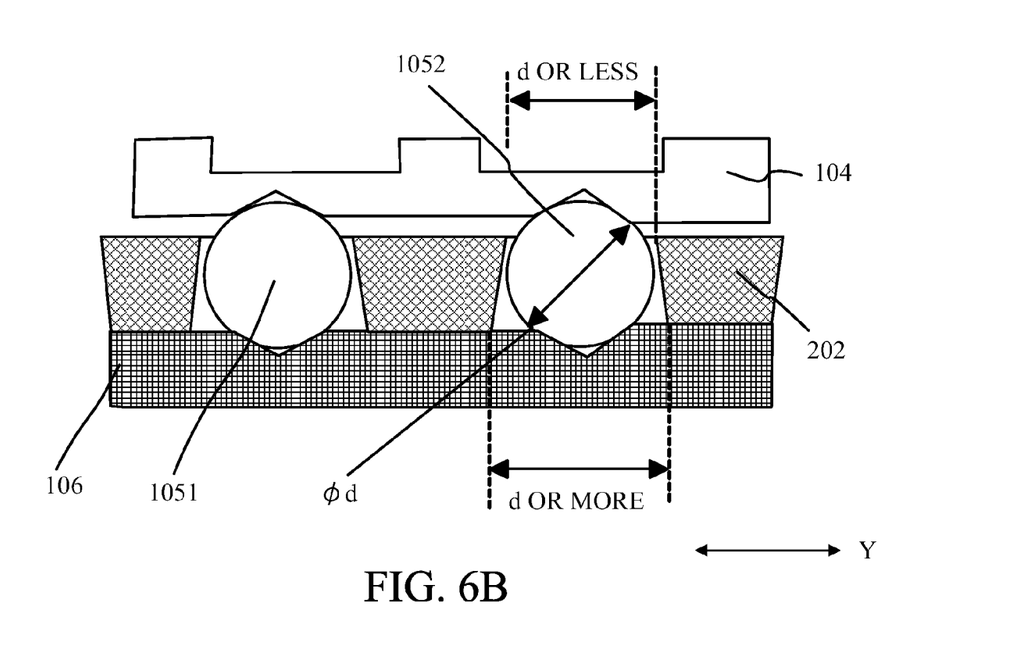

FIG. 6B illustrates a sectional surface in the yaw direction through a center of the first rolling balls 1051 and 1052 in this embodiment.

In this embodiment, only the shape of the second rolling ball arrangement groove provided on the movable lens barrel 203 and the shape of a sectional surface of the first rolling ball arrangement groove provided on the fixed base plate 202 are different from those of the first embodiment, and the other is the same as the first embodiment.

As illustrated in FIG. 6A, the second rolling ball arrangement groove provided on the movable lens barrel 203 has a trapezoidal sectional surface where the width of its top (side contacting the second rolling holder) is larger than the diameter φd of the second rolling ball and the width of its bottom (side of the guiding member) is smaller than the diameter d. In other words, the width of the trapezoid top is wider than the width d of the second rolling ball and narrower than the width 2d. When it is narrower than the width d, the second rolling ball cannot be entered. When it is wider than the width 2d, its assembly becomes difficult. Moreover, the width of the trapezoid bottom is narrower than the width d of the second rolling ball and wider than the width 2/3d. When it is wider than the width d, the second rolling ball freely moves and the assembly becomes difficult. When it is narrower than the width 2/3d, the second rolling ball contacts a side wall of the second rolling ball arrangement groove and the balls cannot roll. Therefore, the second rolling balls 1071 and 1072 can be entered from one plane and never fall out from the other plane. Accordingly, the second rolling balls 1071 and 1072 can be integrated with the lens barrel unit by entering the second rolling balls 1071 and 1072 to the movable lens barrel 203 and fixing the second rolling holder 108 and the movable lens barrel 203.

As a result, in vibration and shock, a dropout of the second rolling balls 1071 and 1072 can be prevented. Moreover, the assembly working property improves and the assembly cost can be decreased.

As illustrated in FIG. 6B, the first rolling ball arrangement groove provided on the fixed base plate 202 has a trapezoidal sectional surface where the width of its top (side of the guiding member) is smaller than the diameter φd of the first rolling ball and the width of its bottom (side contacting the first rolling holder) is larger than the diameter d. In other words, the width of the trapezoid top is narrower than the width d of the first rolling ball and wider than the width 2/3d. When it is wider than the width d, the first rolling ball freely moves and the assembly becomes difficult. When it is narrower than the width 2/3d, the first rolling ball contacts a side wall of the first rolling ball arrangement groove and the balls cannot roll. Moreover, the width of the trapezoid bottom is wider than the width d of the first rolling ball and narrower than the width 2d. When it is narrower than the width d, the first rolling ball cannot be entered. When it is wider than the width 2d, the assembly becomes difficult. Therefore, the first rolling balls 1051 and 1052 can be entered from one plane and never fall out from the other plane. Accordingly, the first rolling balls 1051 and 1052 can be integrated with the fixture part unit by entering the first rolling balls 1051 and 1052 to the fixed base pate 202 and fixing the first rolling holder 106 and the fixed base plate 202.

As a result, in vibration or shock, a dropout of the first rolling balls 1051 and 1052 can be prevented. Moreover, the assembly working property improves and the assembly cost can be decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-121366, filed May 27, 2010 which is hereby incorporated by reference herein in its entirety.

What is claimed is:

1. An image stabilizing apparatus for correcting an image shake by moving an optical element arranged in a lens barrel in a plane orthogonal to an optical axis, the image stabilizing apparatus comprising:
 a first rolling member;
 a first holder contacting the first rolling member and allow the first rolling member to roll so that the first rolling member moves along a first direction orthogonal to the optical axis, the first rolling member moving the optical element in the first direction;
 a fixed member fixed to a surface of the first holder and fixed to the lens barrel, the surface of the first holder being located on a first side where the first rolling member is provided; and
 a guiding member contacting the first rolling member and movable in the first direction,
 wherein the fixed member includes a first through-hole for housing the first rolling member.

2. The image stabilizing apparatus according to claim 1, further comprising:
 a second rolling member;
 a second holder contacting the second rolling member and configured to allow the second rolling member to roll so that the second rolling member moves along a second direction different from the first direction and orthogonal to the optical axis, the second rolling member moving the optical element in the second direction; and
 a movable member fixed to a surface of the second holder and holding the optical element, the surface of the second holder being located on a second side where the second rolling member is provided,
 wherein the guiding member contacts the second rolling member and movable in the second direction, and
 wherein the movable member includes a second through-hole for housing the second rolling member.

3. The image stabilizing apparatus according to claim 2, further comprising:
 a feed cable configured to supply a power from a power source,
 wherein at least part of the feed cable is disposed between the movable member and the second holder.

4. The image stabilizing apparatus according to claim 2, wherein the second holder has hardness higher than hardness of the movable member.

5. The image stabilizing apparatus according to claim 2, wherein the second through-hole has an opening in a third side contacting the second holder and an opening in a forth side opposite to the third side, a width of the opening in the third side being larger than a diameter of the second rolling member, and a width of the opening in the forth side being smaller than the diameter of the second rolling member.

6. The image stabilizing apparatus according to claim 1, wherein the first holder has hardness higher than hardness of the fixed member.

7. An image stabilizing apparatus for correcting an image shake by moving an optical element arranged in a lens barrel in a plane orthogonal to an optical axis, the image stabilizing apparatus comprising:
 a first rolling member;
 a first holder contacting the first rolling member and configured to allow the first rolling member to roll in a first direction orthogonal to the optical axis, the first rolling member moving the optical element in the first direction;
 a fixed member fixed to a surface of the first holder and fixed to the lens barrel, the surface of the first holder being located on a first side where the first rolling member is provided; and
 a guiding member contacting the first rolling member and movable in the first direction,
 wherein the fixed member includes a first through-hole for housing the first rolling member, and
 wherein the first through-hole has an opening in the first side contacting the first holder and an opening in a second side opposite to the first side, a width of the opening in the first side being larger than a diameter of the first rolling member, and a width of the opening in the second side being smaller than the diameter of the first rolling member.

8. An optical apparatus comprising:
 an optical element arranged in a lens barrel; and
 an image stabilizing apparatus for correcting an image shake by moving the optical element arranged in a plane orthogonal to an optical axis,
 wherein the image stabilizing apparatus comprises:
 a first rolling member;
 a first holder contacting the first rolling member and configured to allow the first rolling member to roll so that the first rolling member moves along a first direction orthogonal to the optical axis, the first rolling member moving the optical element in the first direction;

a fixed member fixed to a surface of the first holder and fixed to the lens barrel, the surface of the first holder being located on a side where the first rolling member is provided; and a guiding member contacting the first rolling member and movable in the first direction, wherein the fixed member includes a first through-hole for housing the first rolling member.

9. An image stabilizing apparatus for correcting an image shake by moving an optical element arranged in a lens barrel in a plane orthogonal to an optical axis, the image stabilizing apparatus comprising:

a rolling member configured to move the optical element in a predetermined direction orthogonal to the optical axis;

a holder contacting the rolling member and configured to allow the rolling member to roll so that the rolling member moves along the predetermined direction;

a guiding member contacting the rolling member and moveable in a direction orthogonal to the optical axis and different from the predetermined direction;

a movable member fixed to a surface of the holder and configured to hold the optical element, the surface of the holder being located on a side where the rolling member is provided; and wherein the movable member includes a through-hole for housing the rolling member.

10. The image stabilizing apparatus according to claim 9, further comprising:

a feed cable configured to supply a power from a power source, wherein at least part of the feed cable is disposed between the movable member and the holder.

11. The image stabilizing apparatus according to claim 9, wherein the holder has hardness higher than hardness of the movable member.

12. The image stabilizing apparatus according to claim 9, wherein the through-hole has an opening in one side contacting the holder and an opening in another side opposite to the one side, a width of the opening in the one side being larger than a diameter of the rolling member, and a width of the opening in the opposite side being smaller than the diameter of the rolling member.

13. An optical apparatus comprising:

an optical element arranged in a lens barrel; and an image stabilizing apparatus configured to correct an image shake by moving the optical element arranged in a plane orthogonal to an optical axis, wherein the image stabilizing apparatus comprises:

a rolling member configured to move the optical element in a predetermined direction orthogonal to the optical axis;

a holder contacting the rolling member and configured to allow the rolling member to roll so that the rolling member moves along the predetermined direction;

a guiding member contacting the rolling member and moveable in a direction orthogonal to the optical axis and different from the predetermined direction;

a movable member fixed to a surface of the holder and configured to hold the optical element, the surface of the holder being located on a side where the rolling member is provided; and wherein the movable member includes a through-hole for housing the rolling member.

* * * * *